Dec. 6, 1966  K. JANISZEWSKI  3,290,070
MEANS FOR RELEASABLY MOUNTING BEARING
MEMBERS ON THE PLATENS OF A DIE SET
Filed May 14, 1964
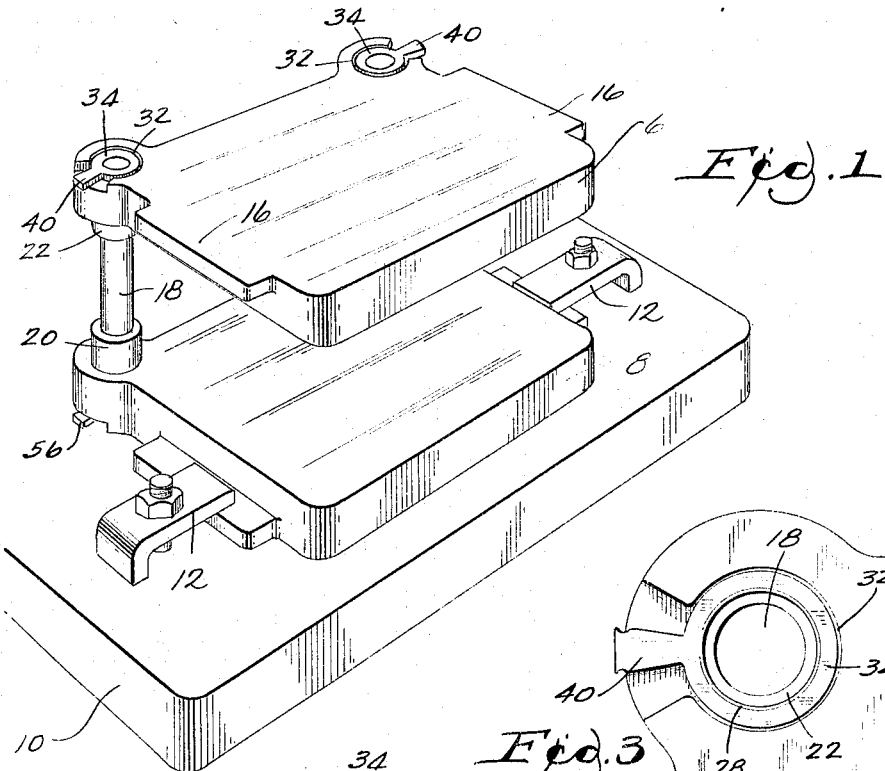
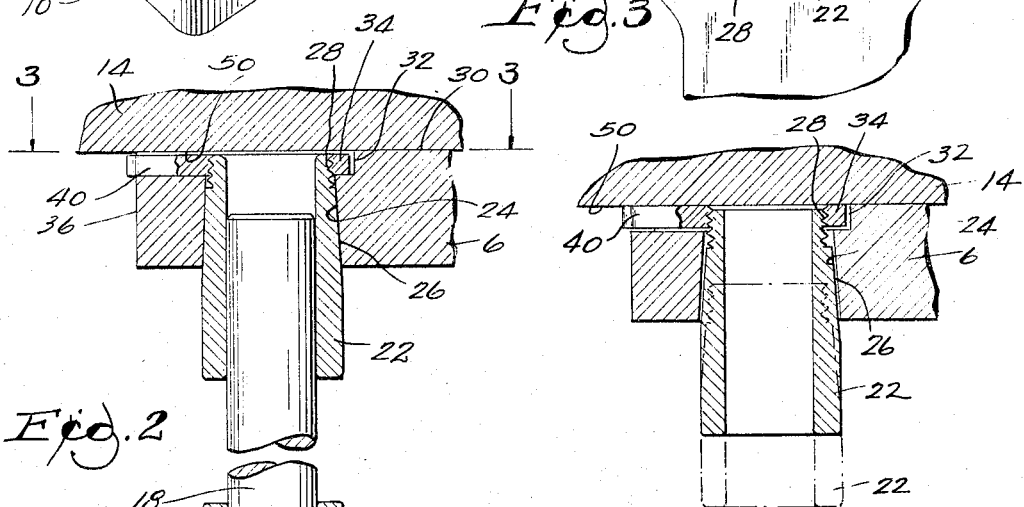
INVENTOR.
KASIMIR JANISZEWSKI
BY
Wheeler, Wheeler Wheeler
ATTORNEYS : 3,290,070
Patented Dec. 6, 1966

3,290,070
MEANS FOR RELEASABLY MOUNTING BEARING MEMBERS ON THE PLATENS OF A DIE SET
Kasimir Janiszewski, 5426 Andover Road, Milwaukee, Wis.
Filed May 14, 1964, Ser. No. 367,341
3 Claims. (Cl. 287—20.3)

This invention relates to a means for releasably mounting bearing members on the platens of a die set.

It has been common to taper the end of a bearing member such as a leader pin or bushing for reception into a correspondingly tapered platen socket. However, in cases in which a nut threaded to the bearing member is used to tighten the bearing member in the socket, the nut has either been exposed outside of the top surface or has been countersunk within a blind hole in said surface.

According to the present invention, the platen which is to receive the bearing member is provided with a recess which opens from the smaller end of the tapered socket to the adjacent margin of the platen. A nut within the recess in registry with the socket is equipped with an operating lever that projects laterally from the recess and is exposed beside the platen. The instant application shows the invention applied for the anchorage of both leader pins and bushings and the recesses are formed both in the lower platen or die shoe and the upper platen or punch carrier.

The invention has advantages both from the standpoint of convenience and from the standpoint of safety. To remove a bearing member, it is not necessary to disconnect or lift the die set from the press on which it is being used, since a slight movement of the projecting lever will not merely release the nut but will actually operate to cam the bearing member free of its tapered socket sufficiently so that it can be withdrawn. From the standpoint of safety, it is very advantageous not to have either nuts or threaded portions of any bearing member projecting from the platen surface. Where there is any such projection, there is danger that the operator's clothing may become caught on the projecting part.

In the drawings:

FIG. 1 fragmentarily illustrates in perspective a portion of a press having mounted thereon a die set embodying the invention.

FIG. 2 is an enlarged detail view in vertical section through a die set embodying the invention, portions of the upper and lower platens of the press being fragmentarily illustrated.

FIG. 3 is a fragmentary detail view taken in section on the line 3—3 of FIG. 2.

FIG. 4 is a fragmentary detail view similar to a portion of FIG. 2 but showing the parts as they appear when released by manipulation of the lever which projects from the nut.

The die set comprises a punch carrier member 6 and die shoe member 8. It is intended to be used in a press by mounting the die shoe 8 upon the press bed 10, to which it is attached by hold-down members 12 in a conventional manner. The die (not shown) is attached to the die shoe 8 and cooperates with a punch on punch carrier 6 actuated by the upper press platen 14, to which it may be attached by similar hold-down devices applied to the end flanges 16.

During the operation of the press, the punch carrier 6 is moved to and from the die shoe 8 and guided by any desired number of leader pins 18. The leader pin element is usually fixed in a bushing 20 attached to the die shoe 8 and is telescopically slideable in a bushing element 22 fixed to the punch carrier 6. Thus, the installation contemplates bearing members detachably connected respectively with the die shoe and punch carrier members of the set. As is well-known in the art, the leader pin 18 might be directly connected with the die shoe 8 if formed to provide a tapered and threaded extremity which could be substituted for the intermediate mounting bushing 20.

As aforesaid, it is an object of the invention to enable the bearing members to be withdrawn and replaced without detaching the punch carrier and die shoe elements of the die set from the press platens 14 and 10. To this end, the punch carrier 6 is provided with a tapered socket at 24 in which the tapered portion 26 of the bearing member 22 is seated. The upper extremity of the bearing member or bushing 22 has threads 28 and terminates short of the top surface 30 of the punch carrier 6. The punch carrier has a shallow recess 32 in which nut 34 is disposed in alignment with the socket 24. The nut is screwed on the threaded extremity 28 of the bearing member or bushing 22.

Recess 32 opens laterally to the end surface 36 of the punch carrier element and the nut has a lever 40 fixed to it and desirably integral with it and of such length as to project from the recess 32 in the manner clearly shown in FIGS. 1, 2 and 3.

When the lever 40 is manipulated in a direction to tighten the nut 34 upon the threads 28 at the end of the bearing member 22, the tapered portion 26 of the bearing member is drawn snugly into the tapered socket 24 so that the bushing is thereupon anchored very securely to the punch carrier element 6. However, with the parts engaged as shown in FIGS. 2 and 4, a reverse movement of the nut 34 will cause it to unscrew and engage the under surface 50 of the press platen 14, thereby forcing the bearing member 22 axially in a downward direction to clear its tapered surface 26 from tapered socket 24 as is clearly shown in FIG. 4. With the parts thus disengaged, the rotation of the bushing element 22 can be continued by hand to unscrew it from the nut 34, whereupon it may be completely withdrawn as shown in dotted lines in FIG. 4.

The leader pin element is similarly anchored to the die shoe member 8. As shown, it is not directly connected therewith but is fixed in the intermediate bushing 20 which has a tapered surface 46 received into the tapered socket 44 of the die shoe member 8. The die shoe member has a recess 42 for nut 50, which is screwed onto the threads 52 at the lower end of the leader pin mounting bushing 20. As before, the recess 42 opens to the end surface 54 of the die shoe member 8 and the nut 50 has a projecting lever 56 exposed beyond the die shoe for manipulation to tighten the bushing in the die shoe or, in a reverse direction of oscillation, to release the leader pin element and to force it and its mounting bushing out of the tapered socket sufficiently to enable its withdrawal to be completed readily. FIG. 2 shows the nut tightened against the die shoe member 8 but it will be apparent on comparison with FIG. 2 and FIG. 4 that a converse manipulation of the nut will force it into thrust engagement with the top surface 58 of the press platen 10, thereby pushing the mounting bushing element 20 from the die shoe socket.

I claim:
1. In a die set having die shoe and punch carrier members adapted to be mounted between the upper and lower platens of a press and having bearing means for guiding the punch carrier with respect to the die shoe during relative reciprocation of said platens, the improvement which comprises the combination with at least one of said members which has a tapered socket and a recess opening therefrom to an adjacent side surface of said member, of a bearing element having a tapered external surface portion mounted in said socket and provided beyond said tapered portion with external threads disposed within the recess, a nut screwed onto said threads and disposed within the recess in close proximity to the member surface which, in use, engages a press platen, said nut being in engagement with portions of the recess of the member laterally adjacent the socket and having an operating lever projecting through the recess to a position in which an end of said lever is exposed beyond the side surface of said member, said lever having a width substantially less than the width of the portion of the recess extending through the sidewall of said member, said nut being rotatable in the recess to develop thrust for drawing the bearing element tightly into binding engagement in the tapered socket and being oppositely rotatable in abutment with a press platen to release the bearing element from binding engagement in said socket.

2. A die set according to claim 1 in which said recess constitutes a counterbore and a groove, said groove extending laterally through said side surface of the member in which it is formed.

3. A die set according to claim 1 in which both the die shoe member and the punch carrier member have tapered sockets and recesses communicating with the smaller ends of respective sockets and opening laterally to adjacent side surfaces of the respective members, the said recesses being in opposite faces of the members positioned to be engaged respectively by the upper and lower platens of a press with which the die set is used, there being a bushing comprising one bearing element with a tapered surface disposed in the tapered socket of one of said members and a leader pin having a base and constituting another bearing element and having a tapered surface engaged in the corresponding socket of the other of said members, each of said elements having screw threads and nuts screwed thereon and disposed in the respective recesses and provided with operating levers projecting laterally from the respective members.

References Cited by the Examiner

UNITED STATES PATENTS

| | | | |
|---|---|---|---|
| 903,435 | 11/1908 | Barrott | 279—100 |
| 2,405,825 | 8/1946 | Grunow | 287—20 X |
| 2,441,467 | 5/1948 | Browning | 287—52.06 |
| 3,143,366 | 8/1964 | Nichols | 287—53 |
| 3,176,378 | 4/1965 | Janiszewski | 308—4 X |

THOMAS F. CALLAGHAN, *Primary Examiner.*

CARL W. TOMLIN, *Examiner.*

T. A. LISLE, *Assistant Examiner.*